(12) United States Patent
Franke

(10) Patent No.: US 8,205,205 B2
(45) Date of Patent: Jun. 19, 2012

(54) MULTI-OBJECTIVE ALLOCATION OF COMPUTATIONAL JOBS IN CLIENT-SERVER OR HOSTING ENVIRONMENTS

(75) Inventor: Carsten Franke, Carrickfergus (GB)

(73) Assignee: SAP AG, Walldorf (DE)

( * ) Notice: Subject to any disclaimer, the term of this patent is extended or adjusted under 35 U.S.C. 154(b) by 1449 days.

(21) Appl. No.: 11/724,706

(22) Filed: Mar. 16, 2007

(65) Prior Publication Data

US 2008/0229318 A1    Sep. 18, 2008

(51) Int. Cl.
  *G06F 9/46*    (2006.01)
  *G06F 15/173*    (2006.01)
  *G06F 15/16*    (2006.01)

(52) U.S. Cl. ........ 718/103; 718/104; 718/105; 709/201; 709/223

(58) Field of Classification Search .................... 718/103
  See application file for complete search history.

(56) References Cited

U.S. PATENT DOCUMENTS

| | | | |
|---|---|---|---|
| 5,655,120 | A | 8/1997 | Witte et al. |
| 5,872,972 | A | 2/1999 | Boland et al. |
| 6,078,944 | A | 6/2000 | Enko et al. |
| 6,718,359 | B2 | 4/2004 | Zisapel et al. |
| 6,728,748 | B1 * | 4/2004 | Mangipudi et al. ........... 718/105 |
| 6,986,140 | B2 | 1/2006 | Brenner et al. |
| 6,993,767 | B2 | 1/2006 | Brenner et al. |
| 7,016,412 | B1 | 3/2006 | van Zon |
| 7,075,541 | B2 | 7/2006 | Diard |
| 7,093,250 | B1 * | 8/2006 | Rector .......................... 718/100 |
| 7,552,171 | B2 * | 6/2009 | Chidambaran et al. ....... 709/203 |
| 2002/0059427 | A1 * | 5/2002 | Tamaki et al. ................. 709/226 |
| 2002/0069279 | A1 * | 6/2002 | Romero et al. ............... 709/225 |
| 2002/0087694 | A1 * | 7/2002 | Daoud et al. ................. 709/226 |

FOREIGN PATENT DOCUMENTS

| | | |
|---|---|---|
| JP | 2009269903 | 10/1997 |
| WO | 2006100752 A1 | 9/2006 |

OTHER PUBLICATIONS

Office Action for JP Application No. 2008-030988 (with English Translation), mailed Feb. 15, 2011, 14 pages.
Office Action for Chinese Application No. 200810083000.7 (with English Translation), mailed Apr. 26, 2011, 11 pages.
"Essential Virtualization: VSM Talks With HP's Nick van der Zweep", Virtual Strategy Magazine News Staff (Jan. 27, 2005), 4 pages.
"VMware ESX Server 2 NUMA Support", VMware, White Paper (Jul. 2003), 6 pages. "Managing Data Center Virtualization", bmcsoftware Solutions Guide (Dec. 2005), 40 pages.
"Migrate Virtual Machines with Zero Downtime" VMware, Retrieved Mar. 20, 2007 from www.vmware.com/products/vi/vc/vmotion.html, 2 pages.
Naik, V. K., et al., "Performance analysis of job scheduling policies in parallel supercomputing environments", Proceedings of the 1993 ACM/IEEE conference on Supercomputing (Nov. 15, 1993), pp. 824-833.
Extended European Search Report for European Patent Application No. 08004547.9-2211, mailed Jul. 1, 2008, 6 pages.

* cited by examiner

Primary Examiner — Jennifer To
(74) Attorney, Agent, or Firm — Brake Hughes Bellermann LLP

(57) ABSTRACT

A method of processing a computational job with a plurality of processors is disclosed. A request to process a job is received, where the job has a priority level associated with the job. A first group of the processors is designated as being available to process the job, where the number of processors in the first group is based on the priority level associated with the job. A second group of the processors is designated as being available to process the job, where for each processor in the second group a current utilization rate of the processor is less than a second predetermined utilization rate. Then, the job is processed with one or more of the processors selected from the first group of processors and the second group of processors.

20 Claims, 8 Drawing Sheets

| User | Domain | IP | MAC | Flag | Priority | |
|---|---|---|---|---|---|---|
| SAP / Polk | SAP.com | 192.168.99.23 | 00:12:F0:CA:15:96 | -- | 1 | ⟵ 420 |
| SAP / Polk | SAP.com | 192.168.99.4 | 00:12:F0:CA:15:96 | -- | 3 | ⟵ 422 |
| SAP / Polk | SAP.com | 192.168.99.4 | 00:12:F0:CA:20:99 | -- | 3 | ⟵ 424 |
| SAP / Adams | SAP.com | 192.168.99.4 | 00:12:F0:CA:20:99 | -- | 5 | ⟵ 426 |
| SAP / Tyler | SAP.com | 192.168.99.4 | 00:12:F0:CA:20:99 | -- | 3 | ⟵ 428 |
| SAP / Tyler | SAP.com | 192.168.99.4 | 00:12:F0:CA:20:99 | 1 | 1 | ⟵ 430 |
| SAP / Tyler | SAP.com | 192.168.99.4 | 00:12:F0:CA:20:99 | 10 | 10 | ⟵ 432 |
| SAP / Tyler | ABC.com | 123.456.78.7 | 08:00:69:02:01:FC | -- | 5 | ⟵ 434 |
| ABC / Harding | ABC.com | 123.456.78.7 | 08:00:69:02:01:FC | -- | 5 | ⟵ 436 |
| ABC / Johnson | ABC.com | 123.456.78.7 | 08:00:69:02:88:CT | -- | 7 | ⟵ 438 |
| ABC / Bush | ABC.com | 123.456.78.7 | 08:00:69:02:BM:77 | -- | 7 | ⟵ 440 |

FIG. 4

Job Priority Level

| Processor Subset | 1 | 2 | 3 | 4 |
|---|---|---|---|---|
| 1 | 100% | 50% | 30% | 10% |
| 2 | 100% | 100% | 50% | 30% |
| 3 | 100% | 100% | 100% | 50% |
| 4 | 100% | 100% | 100% | 100% |

FIG. 6

MULTI-OBJECTIVE ALLOCATION OF COMPUTATIONAL JOBS IN CLIENT-SERVER OR HOSTING ENVIRONMENTS

TECHNICAL FIELD

This description relates to assignment of computational jobs to physical resources (nodes) for processing in a client-server or hosting environment and, more particularly, to multi-objective allocation of computational jobs in client-server or hosting environments.

BACKGROUND

A server or a hosting environment can consist of a very large number of nodes that are used to process computational requests of different customers. So that the processing of the various customer requests can be as independent as possible from the actual hardware resources to which the requests are assigned, the systems are beginning to use "virtual machines," which are collections of individual physical resources, to processes the users' requests. With virtualization of the physical resources, the virtual machines executing the different customer requests can be migrated to other hardware within the system without influencing the outcome of the corresponding user requests. In addition, the applications that are used to process the user requests do not need to re-configured to adapt to new hardware.

Currently, computational jobs can be allocated by a scheduler to pre-defined virtual machines running on specific hardware within the hosting environment. Alternatively, a load balancer running on the hosting environment can distribute currently running tasks in a way that all resources within the system have a similar utilization. Technically, the load balancer moves the different virtual machines and this can be done easily with existing virtualization techniques. The idea behind load balancing is to utilize the resources of the system as efficiently as possible to maximize the overall throughput of computational jobs within the system. To this end, management software like the Virtual Machine Manager from IBM or the ProLiant Essential Workload Management Pack from HP can be used.

From the customer's point of view, high availability of the hardware resources and short response times to their requests are desirable. From the provider's point of view, a high customer satisfaction is desirable, as this ensures future business from the customers. However, providers have different commercial relationships with the different customers. For example, some customers may be willing to pay more for a higher availability and shorter response time than other customers. Thus, providers would like to provide different service levels (e.g., resource availability and response time) to customers, so that they can cater more to high-priority customers, while still maintaining an adequate service to lower-priority customers.

To date, this kind of emphasis on certain customers has been implemented by dividing the hosting environment used to process the customers' requests into several partitions, with different partitions having different processing bandwidth, and assigning jobs from different customers to different partitions. Unfortunately, this leads to the effect that the overall utilization of the hosting environment is decreased, because idle resources in one partition cannot be used to process jobs for customers that are assigned to other partitions. Furthermore, a customer request assigned to a partition that is already fully utilized (e.g., to process other requests assigned to the partition) cannot be processed at all, even if enough idle resources are available in other partitions. In another implementations, customer quotas have been used to implement a kind of ranking between different customers, such that each customer has a limited amount of processing time per time period on the system. Then, if the customer's allocated time within a time period is already used, no other request from the customer can be processed in that time period. This again leads to a low overall utilization, because some requests are not processed even if enough resources were idle.

SUMMARY

In a first general aspect, a method of processing a computational job with a plurality of processors is disclosed. A request to process a job is received, where the job has a priority level associated with the job. A first group of the processors is designated as being available to process the job, where the number of processors in the first group is based on the priority level associated with the job. A second group of the processors is designated as being available to process the job, where for each processor in the second group a current utilization rate of the processor is less than a second predetermined utilization rate. Then, the job is processed with one or more of the processors selected from the first group of processors and the second group of processors.

Implementations can include one or more of the following features. For example, the second predetermined utilization rate can be based on the priority level of the job and on a subset of processors to which the processor belongs. A number of processors (N) to process the job can be determined, and the job can be processed with the N processors selected from the first and second groups having the lowest current utilization rates. Determining the number of processors to process the job can include receiving a request to process the job with at least N processors. The request can be received through a wide area network.

A third group of processors can be designated as being available to process the job, where for each processor in the third group, a current utilization rate of the processor is less than a third predetermined utilization rate, and where the third predetermined utilization rate is lower than the second predetermined utilization rate; and the job can be processed with one or more of the processors selected from the first, second, and third groups of processors. A number of processors (N) to process the job can be determined; the request can be queued when the sum of the number of the processors in the first and second groups is less than N; and when the sum of the number of the processors in the first and second groups is greater than or equal to N, the job can be processed with the N processors selected from the first and second groups having the lowest current utilization rates.

A number of processors (N) to process the job can be determined; a current utilization rate for processors in the first group can be determined; the first group of processors can be re-designated to exclude those processors having a current utilization rate greater than a predetermined first utilization rate; the request can be queued when the sum of the number of the processors in the re-designated first group and in the second groups is less than N; and when the sum of the number of the processors in the re-designated first group and in the second groups is greater than or equal to N, the job can be processed with the N processors selected from the re-designated first group and from the second group having the lowest current utilization rates.

A new current utilization rate for processors in the second group can be determined, and then the second group of processors can be re-designated to exclude those processors having a new current utilization rate greater than the second predetermined utilization rate, and then the job can be processed with one or more of the processors selected from the first group of processors and the re-designated second group of processors.

In another general aspect, a method of processing a computational job with a plurality of processors is disclosed. A plurality of computational jobs are processed with the plurality of processors. A first group of the processors is designated as being available to process a first job, where the number of processors in the first group is based on a priority level associated with the first job. A second group of the processors is designated as being available to process the job, where for each processor in the second group an initial utilization rate of the processor is less than or equal to an predetermined utilization rate that is based on the priority level and on a processor subset to which the processor belongs. The first job is processed with a plurality of processors selected from the first group of processors and from the second group of processors. A determination is made that a processor in the second group that is processing the first job has an updated utilization rate that is greater than the predetermined utilization rate. Then, in response to the determination, the first job is processed with a plurality of processors selected from the first group of processors and the second group, not including the processor that had a utilization rate greater than the first predetermined utilization rate.

Implementations can include one or more of the following features. For example, for each computational job being processed with the plurality of processors a primary group of the plurality of processors can be designated as being available to process the job, where the number of processors in the primary group for each job is based on a priority level associated with the job, the job can be processed with a group of processors selected from the primary group of processors for the job and a supplemental set of the plurality of processors not belonging to the primary group. A determination can be made that a processor in the supplemental set used to process the job has a utilization rate greater than a utilization rate determined by the priority level of the job. In response to the determination, the job can be processed with a plurality of processors selected from the first group of processors and the second group, not including the processor that had a utilization rate greater than the first predetermined utilization rate.

In another general aspect, a system for processing a computational job, includes an input queue, a plurality of processors, a utilization rate service engine, and a scheduling engine. The input queue is adapted for receiving a receiving a computational job to process, where a priority level is associated with the job. The utilization rate service engine is adapted to determine a utilization rate of the processors, where a first group of the plurality of processors is designated as being available to process the job, where the number of processors in the first group is based on the priority level associated with the job, and where a second group of the plurality of processors, for which a current utilization rate is less than a second predetermined utilization rate, is designated as being available to process the job. The scheduling engine is adapted to receive information about the priority level of the job and about the utilization rates of the processors and to schedule the job to be processed by one or more of the processors selected from the first group of processors and the second group of processors.

Implementations can include one or more of the following features. For example, the first group can consist of one processor. A plurality of processors are adapted to process the job in parallel. The scheduling engine can be adapted to determine a number of processors (N) to process the job and to schedule the job to be processed with the N processors selected from the first and second groups having the lowest current utilization rates. The scheduling engine can be adapted to receive a request to process the job with at least N processors, and the determination of the number of processors (N) to process the job can be based on the request. A third group of the plurality of processors for which a current utilization rate of the processor is less than a third predetermined utilization rate can be designating as being available to process the job, where the third predetermined utilization rate is lower than the second predetermined utilization rate, and the scheduling engine can be further adapted to schedule the job to be processed by one or more of the processors selected from the first, second, and third groups of processors.

The scheduling engine can be further adapted to determine a number of processors (N) to process the job, to hold the job in the queue when the sum of the number of the processors in the first and second groups is less than N, and to release the job for processing by the N processors selected from the first and second groups having the lowest current utilization rates of the job when the sum of the number of the processors in the first and second groups is greater than or equal to N.

The utilization rate service engine can be further adapted to determine a current utilization rate for processors in the first group, and the system can further include a processor grouping engine adapted to re-designate the first group of processors to exclude those processors having a current utilization rate greater than a predetermined first utilization rate. In this implementation, the scheduling engine can be further adapted to determine a number of processors (N) to process the job, to hold the job in the queue when the sum of the number of the processors in the re-designated first group and in the second group is less than N, and to release the job for processing by the N processors selected from the re-designated first group and from the second group having the lowest current utilization rates when the sum of the number of the processors in the re-designated first group and in the second groups is greater than or equal to N.

The utilization rate service engine can be further adapted to determine a new current utilization rate for processors in the second group, and the system can further include a processor grouping engine adapted to re-designate the second group of processors to exclude those processors having a new current utilization rate greater than the second predetermined utilization rate. In this implementation, the scheduling engine can be further adapted to schedule the job to be processed by one or more of the processors selected from the first group of processors and the re-designated second group of processors.

The details of one or more implementations are set forth in the accompanying drawings and the description below. Other features will be apparent from the description and drawings, and from the claims.

BRIEF DESCRIPTION OF THE DRAWINGS

FIG. 4 is a table illustrating different priority levels that can be assigned to different computational jobs that are submitted for processing.

FIG. 6 is a matrix showing different utilization rate threshold values that depend on the priority level of a job and the subset of the processors on which the job runs.

DETAILED DESCRIPTION

Figure 1:
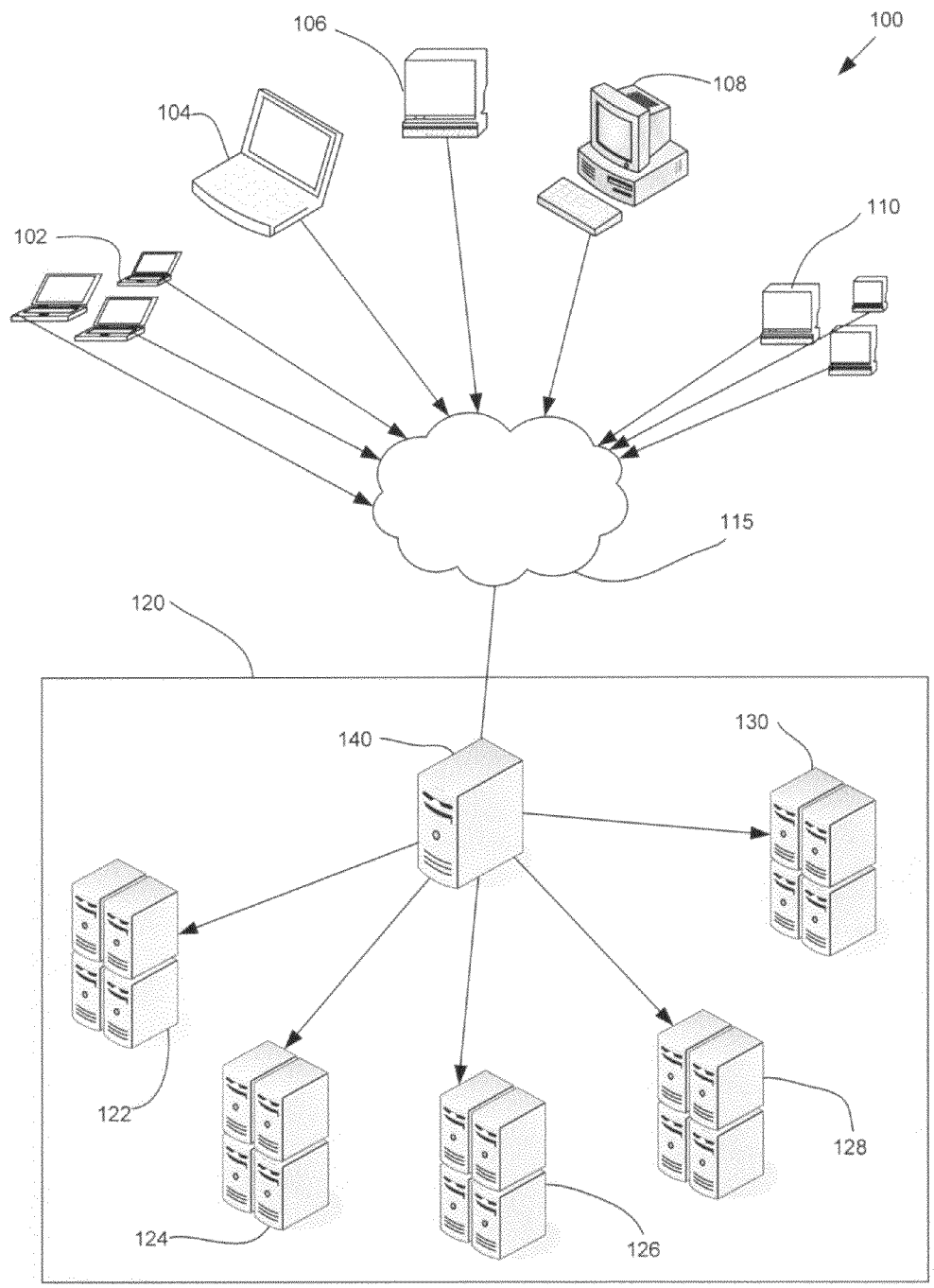
FIG. 1 is a block diagram of a system having multiple processors for processing multiple computational jobs in parallel.

FIG. 1 is a block diagram of a system 100 having multiple processors for processing multiple computational jobs in parallel. Computational jobs can be submitted from many different clients 102, 104, 106, 108, 110, which can be, for example, laptop computers 102 and 104, personal computers 108 and 110, a work station 106, or any other computing device. Clients 102-110 can communicate with a data center (e.g., a server) 120 through a network 115 that includes wired and/or wireless links between clients 102-110 and the server 120 to facilitate the exchange of data between the clients and the server. The network can be, for example, a local area network ("LAN"), such as an intranet, or a wide area network ("WAN"), such as the Internet, or can include one or more LAN's and WAN's.

The data center 120 generally possesses greater computing resources (e.g., greater memory space, more storage capacity, and/or an ability to perform more flops per second) than the clients do. Therefore, the data center receives requests from multiple clients 102-110 to process computational jobs for the clients using computational resources of the data center. For example, in one implementation, the clients can be autonomous computing devices that run their own operating systems and generally run their own application programs but that rely on the data center to perform computationally intense jobs for them at their request. For example, a job involving a highly accurate, three-dimensional, time-dependent simulation of a physical event may be beyond the capability of a client's resources, such that the client submits the job to the data center 120 for processing. In another example, the data center may store large amounts of data for the clients and may host an application for processing the data at the request of a client. For example, the data center 120 may store financial information about the customers of a bank, and the bank may call upon the resources of the data center to process the information, e.g., to perform a daily reconciliation of the customers' financial transactions. Similarly, in another implementation, the data center 120 can host an application that can be run for the benefit of a client 102-110, such that the client does not have to maintain the necessary resources to run the application locally, but rather only needs to submit the necessary information to the data center 120, so that the data center can run the application and return the results of running the application to the client.

The data center 120 includes multiple processors (or processing nodes) 122-130 for performing computational tasks to satisfy the requests of the clients 102-110 and a scheduling server (or scheduling node) 140 that distributes different client jobs to different processors. In another implementation, the data center 120 can include multiple scheduling servers for performing tasks associated with distributing incoming client jobs to different processors for processing. As explained in more detail herein, when allocating incoming jobs to different processors for processing, the scheduling server(s) 140 can consider a priority level associated with the job to determine which processors 122-130 to allocate for the processing of the client job. By considering the priority levels of different jobs during the scheduling process the scheduling server 140 can ensure that jobs with a highest priority level will receive the greatest availability of computational resources from the processors, perhaps at the expense of jobs with lower priority levels during times when the resources are heavily used, while also ensuring that adequate resources are made available to lower priority jobs when the resources are not needed by higher priority jobs. Also, while multiple jobs are running on multiple processors 122-130, the scheduling server(s) 140 can monitor the utilization rate of computational resources used by the different jobs and, if necessary, can dynamically reallocate jobs to different processors 122-130. The dynamic reallocation can result in lower priority jobs being re-allocated to different processors to ensure that the highest priority jobs will continue to receive the greatest availability of computational resources.

The processors 122-130 in the data center 120 can be, for example server computers, blade servers, personal computers, individual processors, or any other type of processing device adapted for performing a computational job. In general, the processors 122-130 include a processing core and access to memory spaces.

Figure 2:
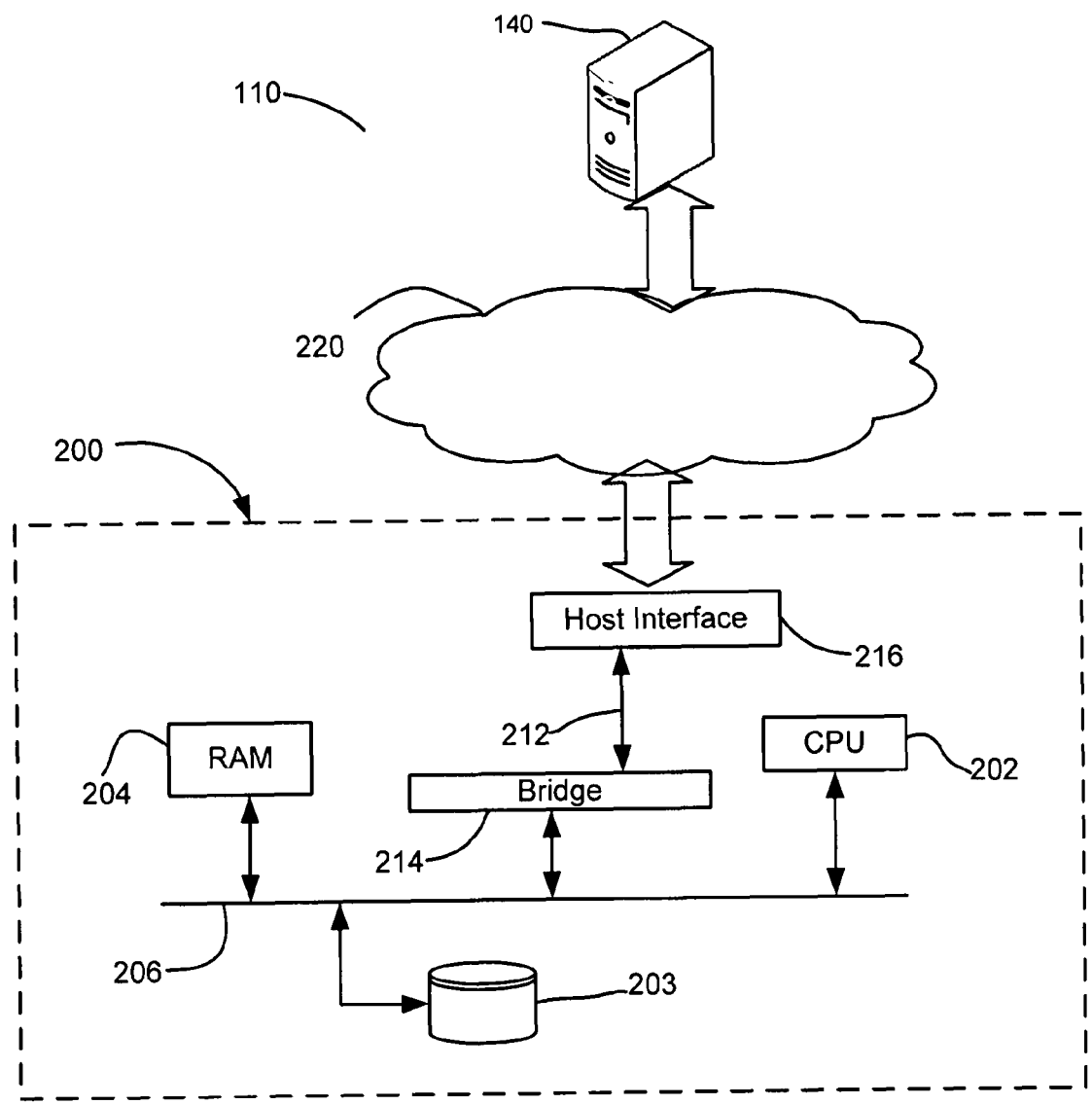
FIG. 2 is a block diagram of an exemplary processor that can be used in the system of FIG. 1 to process a computational job.

FIG. 2 is a block diagram of an exemplary processor 200 that can be used in the system of FIG. 1 to process a computational job. The processor 200 can be, for example, a personal computer, a server computer, a blade, a work station, a personal digital assistant (PDA), or any other kind of computing device capable of being operatively linked to the scheduling server 140 though a network 220. Thus, the processor 200 can receive jobs to process that have been scheduled by the scheduling server 140 to the processor. When the processor 200 has completed the job, or a part of the job, the processor 200 can notify the scheduling server 140 that it has finished the job or a portion of the job and can return the results of the processing to the client 102-110 that requested the processing. The results can be retuned through a path that does or does not include the scheduling server 140.

The processor 200 can include a central processing unit (CPU) 202, a fixed storage device (e.g., a hard disk, non-volatile (e.g., Flash) memory, or removable, recordable media (e.g., a CD)) 203, and a random access memory (RAM) 204 that are operatively coupled together, and that can exchange information, over a bus 206 (e.g., a Peripheral Component Interconnect (PCI) bus or other such computer expansion bus). The storage device 203 can be a non-volatile memory device capable of storing computer-readable instructions (e.g., software) that can be transferred to the RAM 204 for execution by the CPU 202. For example, the storage device 203 can store an operating system and/or one or more application programs that can be executed by the CPU 202 of the processor 200. The network 220 can be, for example, a LAN, a WAN, the Internet, or an intranet. The network 220 can be coupled to the processor, for example, though physical media (e.g., copper wires) upon which electrical signals propagate, through fiber optic cables (e.g., glass fibers) through which optical signals propagate, though wireless communication channels though which electromagnetic signals propagate, or through some combination of various communication channels.

The processor 200 also includes a network interface device (NID) 116 that is configured to couple the processor 200 to the network 220. The NID 216 can include various protocol processing modules that enable the processor 200 to exchange data with the computer network 220. To accommodate the transfer of data packets needed to support these applications, transmission control protocols (TCP) and other related techniques can be used to properly format the data packets. This formatting facilitates the reception of these packets by remote-end equipment connected to the processor 200 through the network 220. The NID 216 can be coupled to the CPU 102 and the memory 204 through a host bus 212 and a bridge 214.

For a processor 200 connected to the network 220 to communicate with the scheduling server 140 and/or with other processor and/or with clients 102-110, the various devices must be able to identify each other. Thus, every NID 216 connected to the network 220 has a unique serial number (e.g., a 48-bit number), sometimes known as a MAC address, which can be used to uniquely identify the NID 216 (and therefore the processor 220) to the network 220 and to other processors and clients connected to the network.

Figure 3:
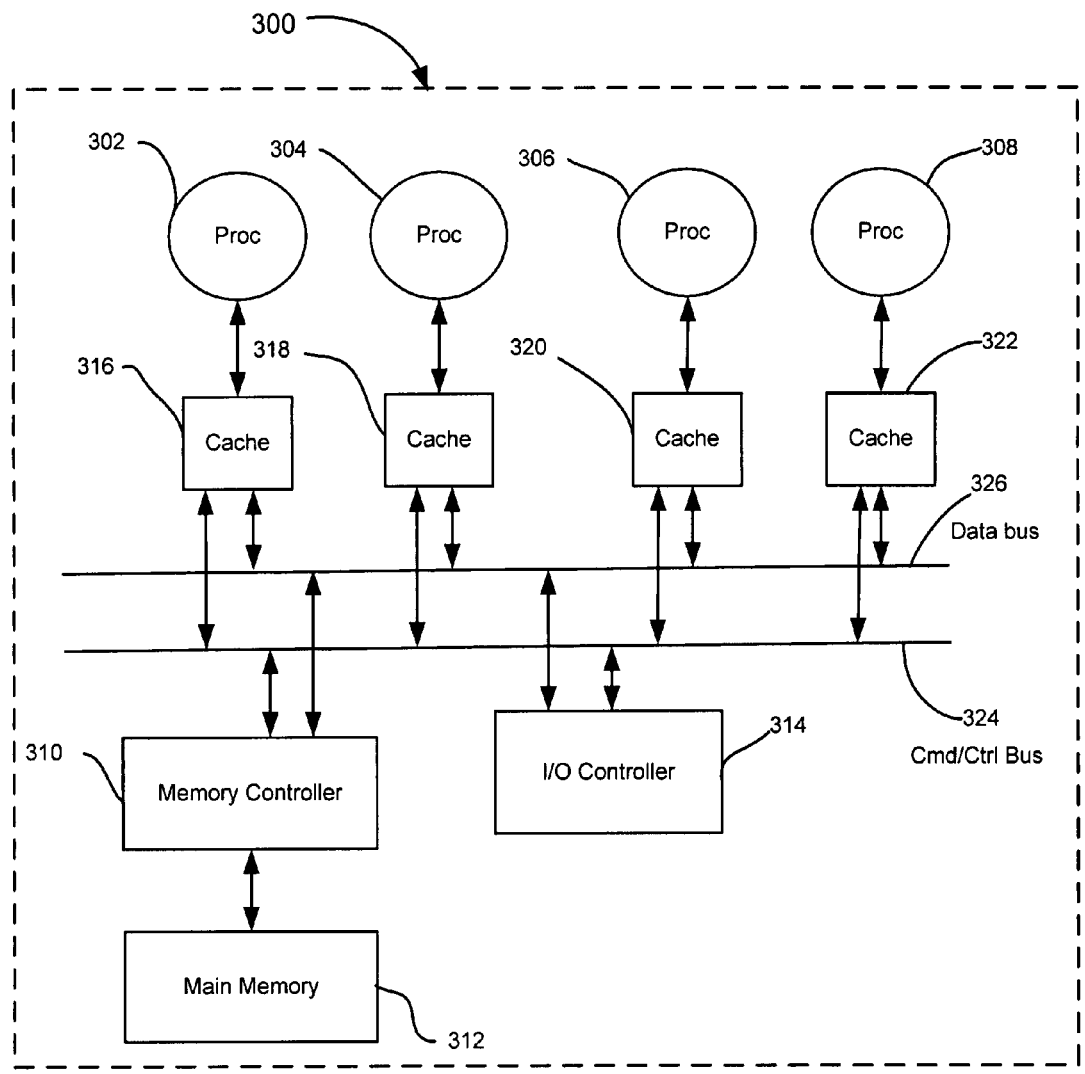
FIG. 3 is a block diagram of another exemplary processor that can be used in the system of FIG. 1 to process a computational job.

FIG. 3 is a block diagram of other exemplary processors 302, 304, 308, and 308 that can be used in the system of FIG. 1 to process a computational job. The processors 302, 304, 308, and 308 can part of a multi-core System on a Chip ("SOC"), which itself can be referred to as a processor, as used herein. Each of the processors 302, 304, 308, and 308 can be a central processing unit core, a digital signal processor ("DSP"), or another data processing module.

The processors 302, 304, 306, and 308 are connected to a memory controller 310 that controls access to a main memory 312 (e.g., a high speed random access memory ("RAM")). The processors 302, 304, 306, and 308 also are connected to an input/output (I/O) processor 314 that manages input and output operations between the processors and external devices. For example, the I/O processor 114 may handle communications between the processors 302, 304, 306, and 308 and an external disk drive.

Each processor 302, 304, 306, and 308 can be associated with a cache element 316, 318, 320, and 322, respectively, which buffers data exchanged with the main memory 312. Cache elements 316, 318, 320, and 322 are commonly used with processors 302, 304, 306, and 308 because the processing speed of the processors 302, 304, 306, and 308 is generally much faster than the speed of accessing the main memory 112. With the cache elements 316, 318, 320, and 322, data can be retrieved from memory 312 in blocks and stored temporarily in a format that can be accessed quickly in the cache elements 316, 318, 320, and 322, which are located close to the associated processors 302, 304, 306, and 308. The processors 302, 304, 306, and 308 then can access data from their associated cache elements 316, 318, 320, and 322, more quickly than if the data had to be retrieved from the main memory 312.

Communications between the processors 302, 304, 306, and 308, the cache elements, 316, 318, 320, and 322 and the main memory 312 generally occurs over a shared bus, which can include an address and command bus 324 and a data bus 326. Although the address and command bus 324 and the data bus 326 are shown separately, in some implementations they can be combined into one physical bus. Regardless of whether the shared bus is implemented as a dual bus or a single bus, a set of protocols can be used to govern how individual elements 302-322 that are connected to the bus (i.e., "bus agents") use the bus to communicate amongst themselves.

In many cases during operation of the chip 300 the processors 302, 304, 306, and 308 operate on the same data, in which case the copy of the data retrieved from the main memory 312 and stored in the local cache element 316 associated with a processor 302 must be identical to the copy stored in the local cache 318, 320, and 322 associated with all other processors 304, 306, and 108. Thus, if one processor modifies data stored in its local cache, this change must be propagated to the caches associated with the other processing elements, so that all processors will continue to operate on the same common data. Because of this need for cache coherence among the bus agents, protocols are established to ensure that changes to locally-stored data made by an individual bus agent to its associated cache are communicated to all other caches associated with other bus agents connected to the bus.

The exemplary processors described with reference to FIG. 2 and FIG. 3 merely provide examples of some components of processors that may be used in certain implementations and not intended to imply any limitations on the architecture of a processor that may be used. Any processor adapted to process a computational job can be used.

FIG. 4 is a table 400 illustrating different priority levels that can be assigned to different computational jobs that are submitted for processing. A computational job can be identified by the user 402 that submits the request to process the job. The user 402 can be identified by the company, organization, or client associated with the request to process the job or by the individual person associated with the request. A computational job also can be identified by the domain name 404 from which the request to process the job was sent, by the IP address 406 from which the request was sent, or by the MAC address 408 of the hardware from which the request was sent. A priority level 412 can be associated with a job, and the priority level can be determined based on, for example, information about the request to process the job, including the user 402, the domain name 404, the IP address, and the MAC address 408. In one implementation, when the scheduling server 140 receives a request to process a job, the scheduling server may extract information about the job, such as the information listed in table 400 and can use this information to determine a priority level of the job by looking up a relationship between the extracted information and the priority level, where the relationships are stored in a database on the server 140.

In one example, when the scheduling server 140 receives a request to process a job, the scheduling server can extract the information listed in row 420 from the request and use this information to determine a priority level for the job. The user information 402 (i.e., "SAP/Polk") can be determined from login information when a session is established between a client and the scheduling server. The domain name 404, IP address 406, and MAC address 408 information can be extracted by the scheduling server from header information in packets sent from the client to the server. Based on receipt of the information in row 420, the scheduling server may determine that the priority level of the requested job should be as high as possible and therefore may assign a priority level of "1" to the job. (The convention used herein is that higher priority job are designated by a lower value of the priority level 412. Priority levels of 1-10 are used herein by way of example, with "1" denoting the highest priority level and "10" denoting the lowest priority jobs.) This determination may be based on one or more pieces of the received information 402, 404, 406, and 408 or other information that is not listed in table 400.

Differences in the information received and extracted may dictate a different priority level for a request job. For example, the information about the request listed in row 422 is identical to the information about the request listed in row 420, except for the value of the IP address, and the priority level assigned to the job request in row 422 has a value of "3" instead of "1", as assigned to job 420, thus indicating that a lower priority level may have been assigned to the job in row 422 based on the IP address information. This may be the case if the user (i.e., "Polk") uses the same laptop computer to submit requests 420 and 422 but submits the requests from different locations associated with different IP addresses. For example, the IP address "192.168.99.23" may be associated with an important research laboratory of the company "SAP," while the IP address "192.168.99.4" may be associated with a cafeteria area of the company "SAP," and therefore a higher priority may be associated with the job request 420 than with the job request 422.

In another example, the information about the request listed in row 424 is identical to the information about the request listed in row 426, except that for the request listed in row 424 a user "Polk" makes the request, while in row 426 a user "Adams" makes the request, and the priority assigned to the job requested by Polk is higher than the priority assigned to the job requested by Adams. This may be the case if jobs submitted by Polk have been deemed to be more valuable than jobs submitted by Adams. The value attached to job, and the consequent priority of the job, may be determined based on the relative value of different users' work to a company or because one user pays more to have his jobs processed than a another user does. In this example, Polk may pay more to have his jobs processed with a higher priority than Adams pays to have his jobs processed with a lower priority.

In another example, the information about the requests listed in rows 428, 430, and 432 is identical, except that in rows 430 and 432 the value of a flag 412 is set, i.e., the flag=1 for the request of row 430 and the flag=10 for the request of row 432. The value of the flag can bet set by a user and associated with a job request to override a priority level that would otherwise be determined for the job based on information about the request such as the user 402, the domain 404, the IP address 406, and the MAC address 408. Thus, when a value for the flag 412 is not set, the priority level of the job requested in row 428 may be determined to a default level of "3." However, if the user has a particularly important job the user may be willing to pay extra to have the job processed with higher priority, and therefore the user may assign a value higher than the default level to the job via the flag 512, as in row 430. Similarly, if the user has a relatively less important or urgent job the user may be willing to pay less to have the job processed with a lower priority, and therefore the user may assign a value lower than the default level to the job via the flag 512, as in row 432.

The domain name 404 from which a job request is received also may be used to determine a priority level for the processing of the requested job. Thus, a comparison of the information in rows 428 and 434 shows that when the only difference in a job request is that it comes from the domain "abc.com" rather than "sap.com" the priority of the job may be lower. This may be the case if, for example, a field service technician or consultant submits jobs from within the domains of different customers, and different priority levels are associated with the different customers.

In still another example, different priority levels may be assigned to jobs requested by different users and/or MAC addresses or clients within an organization. Thus, a comparison of information about the requests in rows 436, 438, and 440, illustrates that within the ABC organization, jobs submitted by a user, "Harding" and/or from a MAC address "08:00:69:02:01:FC" may receive a higher priority than jobs submitted by the users "Bush" and "Johnson" and/or from MAC addresses "08:00:69:02:88:CT" and "08:00:69:02:BM:77."

Figure 5:
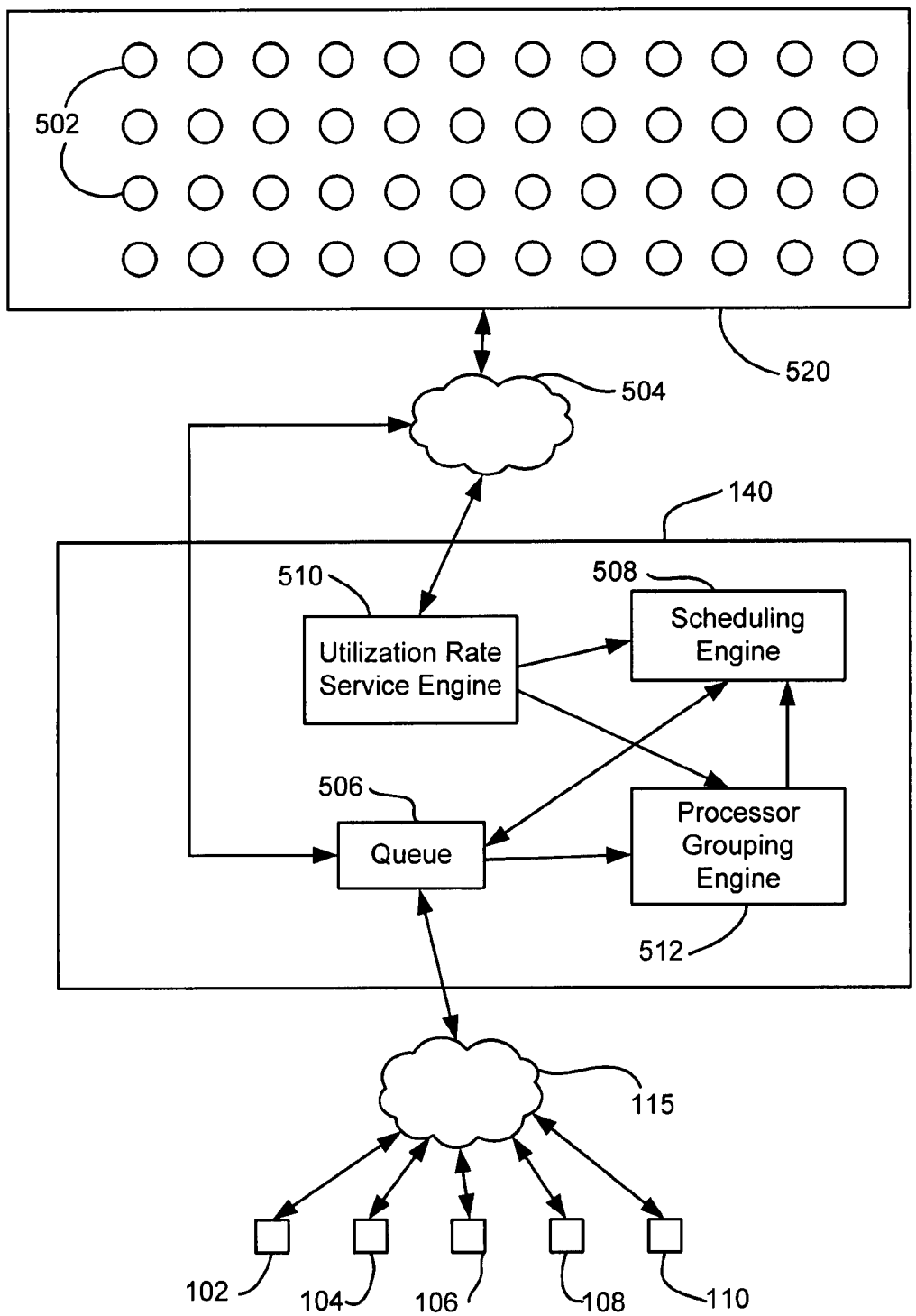
FIG. 5 is a block diagram of a scheduling processor for scheduling computational jobs to one or more processors for processing.

FIG. 5 is a block diagram of a scheduling processor 140 for scheduling computational jobs from one or more clients 102, 104, 106, 108, and 110, to one or more processors 502 for processing by the processors. The total number of processors 520 in a bank 520 of processors available to process jobs can be denoted by m. The scheduling server 140 can route the jobs to the processors 502 directly or through another network 504. Requests to perform a computational job are received from a client through a network 115, and the job can be held in a queue 506 until a scheduling engine 508 in the scheduling server 140 determines which processors 502 should process the job. As explained in more detail herein, the scheduling engine's selection of particular processors to process the requested job can be based on the utilization rates of the processors 502 and the priority level of the requested job. The current utilization of the $i^{th}$ can be denoted by $U_i$, and the number of different priority levels with which jobs can be associated can be denoted by l, where l<m.

A utilization rate service engine 510 can be used to poll the processors 502 to determine a utilization rate of the processors and can report this information to the scheduling engine 508. The utilization rate can be a measurement of the utilization of computational resources available to the processor. For example, the utilization rate can be a measure of the CPU load of the processor, e.g., the fraction of time the CPU is active during a time period. Most modern operating systems contain a routine for performing such a measurement, so the utilization rate service engine 510 can poll the processors to execute such a routine and report the results to the engine 510. In another example, the utilization rate can be a measure of the memory space used by the processor divided by the total amount of memory space available to the processor.

The scheduling server 140 also can include a processor grouping engine 512 that can be used to designate subsets of all the processors 502 in the bank 520 of processors available for processing computational jobs. As explained in more detail below, different subsets of processors can be designated generally for processing jobs based on the priority level of the jobs. In particular, some subsets can be designated for processing high priority jobs (i.e., a having a low value for the priority level 412), while other subsets can be designated for processing high or low priority jobs. However, if the utilization rate of processors belonging to a subset designated for processing high priority jobs is sufficiently low, then the scheduling server 140 can start low priority jobs on processors belonging to that subset. In this manner, overall processing resources are not left idle just so that they can be available in case a high priority job is requested. In addition, whenever low priority jobs are running in a processor subset that has been designated for high priority jobs and the utilization of those processing nodes becomes too high to accommodate a new high priority job, the scheduling server 140 can initiate a reallocation procedure to move the low priority jobs to other processors to free up processors to process the high priority job.

In one implementation, the processor grouping engine 512 can define a subsets of processors for each priority level that can be assigned to a job (i.e., the processor grouping engine 512 can define l different subsets of processors), with the expectation that a job associated with a particular priority level generally will be processed by processors belonging to the particular subset that was defined for jobs of that priority level. The number of processors in each subset can depend on the customer demand for processing jobs of each priority level, where the demand should be estimated from the past experience. Thus, $p_c$ can denote the size (in numbers of processors) of the subset c (where $1 \leq c \leq l$), and $$\sum_{c=1}^{l} p_c = m.$$

Jobs having a particular priority level, however, are not confined to be processed only by the processors in the particular subset that was defined for jobs of that priority level. Rather, low priority requests can be executed on the processors belonging to subsets that have been assigned to process higher priority jobs, so long as the utilization of processors in subsets assigned to process higher priority jobs does not exceed a predefined threshold utilization level. An algorithm for doing this is explained below.

A threshold utilization rate, $U_{cu}$, can be pre-defined for processors in a subset, c. When the current, or momentary, utilization rate, $U_{ciM}$, of a processor in a subset, c, is greater than $U_{cu}$, then the scheduling engine 508 can forbid jobs having a priority level higher than u (where $1 \leq u \leq l$) from being started on the processor. Therefore, low priority jobs cannot use the processor once the processor reaches a threshold level of activity, but higher priority jobs (i.e., having priority level number less than or equal to u) can be started on the processor.

For a system in which l different subsets of processors are defined and l different priority levels can be assigned to different jobs, there must also be $$\left( \frac{l^2 - l}{2} \right)$$

non-trivial utilization values, $U_{cu}$, to enforce this rule. For example, FIG. 6 is a matrix of showing different utilization rate threshold values that depend on the priority level of a job and the subset of the processors on which the job runs. The top row of the matrix indicates the priority level of a job, and the left-most column of the matrix indicates the subset of processors on which the job runs. Utilization rate threshold values that depend on the priority level of a job and on the subset of the processors on which the job runs are presented in the matrix. For example, a job with a priority level of "3" is allowed to run on a processor of the highest priority subset if the processor is has a utilization rate of less than 30% or can run on a processor of the second highest priority subset if that processor has a utilization rate of less than 50%. The job with a priority level=3 can always run on a processor from subset 3 or subset 4.

Thus, for a job having a priority level, u, where $1 \leq u \leq l$, a first group of processors that is available to process the job consists of all the processors in subsets with $c \geq u$. A second group of processors also is available for processing the job but only when the utilization rate of those processors is below a threshold value that depends on the priority level of the job and the subset to which each of those processors has been assigned. For example, if there are 10 different job priority levels and 10 different processor subsets, then when a request to process a job having a priority level of "3" is received, all the processors in subsets c=3, 4, . . . 10 are available to process the job, and processors in subsets c=1 and c=2 are available to process the job only when their utilization rates are below predetermined utilization rates.

Once the processors available to process the job has been determined by the scheduling engine 508 based on information received from the utilization rate service engine 510 and information about the priority level of the job, the scheduling engine can select particular processors to process the job. For example, if the request to process the job included a request to process the job with N processors and the scheduling engine 508 determines that M>N processors are currently available, the scheduling engine can schedule the job to be processed by at least N currently available processors having lowest utilization rates. If the scheduling engine 508 determines that M<N processors are currently available, the scheduling engine may hold the job in the queue 506 until at least N processors are available to process the job. If the request does not explicitly request a particular minimum number of processors for the job, but requests certain performance criteria (e.g., processing speed or finish time), the scheduling engine 508 may determine the number of processors needed to process the job based on the provided information.

In some situations, the utilization rates of processors in the first group of processors may be so high (e.g., above 95% of the maximum CPU utilization rate) that in practice these processors would be ineffective for processing a new job. In such a case, the processor grouping engine 512 may re-designate these over-utilized processors as being temporarily unavailable for processing the new job. Then, if such a re-designation causes the sum of the number of available processors in the first group and the second group to be less than N, the scheduling engine 508 may hold the job in the queue 506 until at least N processors are available to process the job.

According to these rules and guidelines, for each incoming job request, r, the final allocation of the job to processors 502 of the bank 520 can be determined according to the following algorithm. First, the priority level, w, of the request, r, and the number of processors N requested to perform the request are extracted. Then, the set of processors available for processing the job is set to zero. Then, all processors, i, belonging to subsets, $p_c$, associated with priority levels greater than or equal to w are added to the set of available processors ("AP"). Then, for all remaining processors, i, belonging to subsets, $p_c$, with $1 \leq c < w$, the actual utilization rates, $U_{ciM}$, of the processors is determined. If $U_{ciM} < U_{cw}$ for the $i^{th}$ processor, then the $i^{th}$ processor is added to set of available processors. After the set of available processors has been determined, then all processors i are sorted in order of increasing $U_{ciM}$. Finally, if N processors are available, the job specified in request, r, is started on the N processors in the set of available processors having the lowest $U_{ciM}$. If N processors are not available, the job is held in a queue to await the availability of additional resources.

When one or more jobs are running on the plurality of processors 502, the utilization rates of the processors can be monitored periodically by the utilization rate service engine 520, and jobs can be reallocated to different processors if the processors are not being used efficiently. Individual jobs can be tracked by a chronologically-assigned job number to distinguish one job from another. In one implementation, a job can be monitored and reallocated, if necessary, according to the following algorithm.

First, one of the running jobs, r, is chosen for monitoring. The job has a job number and a priority level, w, and is running on N processors. The utilization rate service engine 520 measures the utilization rates of each of the N processors running the job. If the job is running on processor, i, with utilization rate, $U_{ciM}$, in a subset, $p_c$, then if $w \leq c$ (i.e., if the processor is part of a lower or equal priority subset) then no reallocation of the process running on the $i^{th}$ processor is necessary. If $w > c$ and $U_{ciM} < U_{cw}$ (i.e., if the processor is part of a high priority subset but the utilization rate of the processor is below a threshold rate) then no reallocation of the process running on $i^{th}$ processor is necessary. If $w > c$ and $U_{ciM} \geq U_{cw}$ (i.e., if the processor is part of a high priority subset and the utilization rate of the processor is at or above a threshold rate) then the job must be reallocated to different processors.

To reallocate the job to different processors, first the set of processors available for processing the job is set to zero in a counter within the scheduling engine 508. Then, all processors, i, belonging to subsets, $p_c$, associated with priority levels greater than or equal to w are added to the set of available processors. Then, for each remaining processors, i, belonging to subsets, $p_c$, with $1 \leq c < w$, the actual utilization rates, $U_{ciM}$, of the processors is determined. If $U_{ciM} < U_{cw}$ for the $i^{th}$ processor, then the $i^{th}$ processor is added to set of possible available processors. After the set of possible available processors has been determined, then all processors i in the set are sorted in order of increasing $U_{ciM}$. Finally, if N processors are available, the job specified in request, r, is moved to the N processors in the set of available processors having the lowest $U_{ciM}$. If N processors are not available, the job is held in a queue to await the availability of additional resources. This process of monitoring the utilization rates of processors and moving jobs if threshold utilization rates are exceeded is performed for all running jobs.

Figure 7:
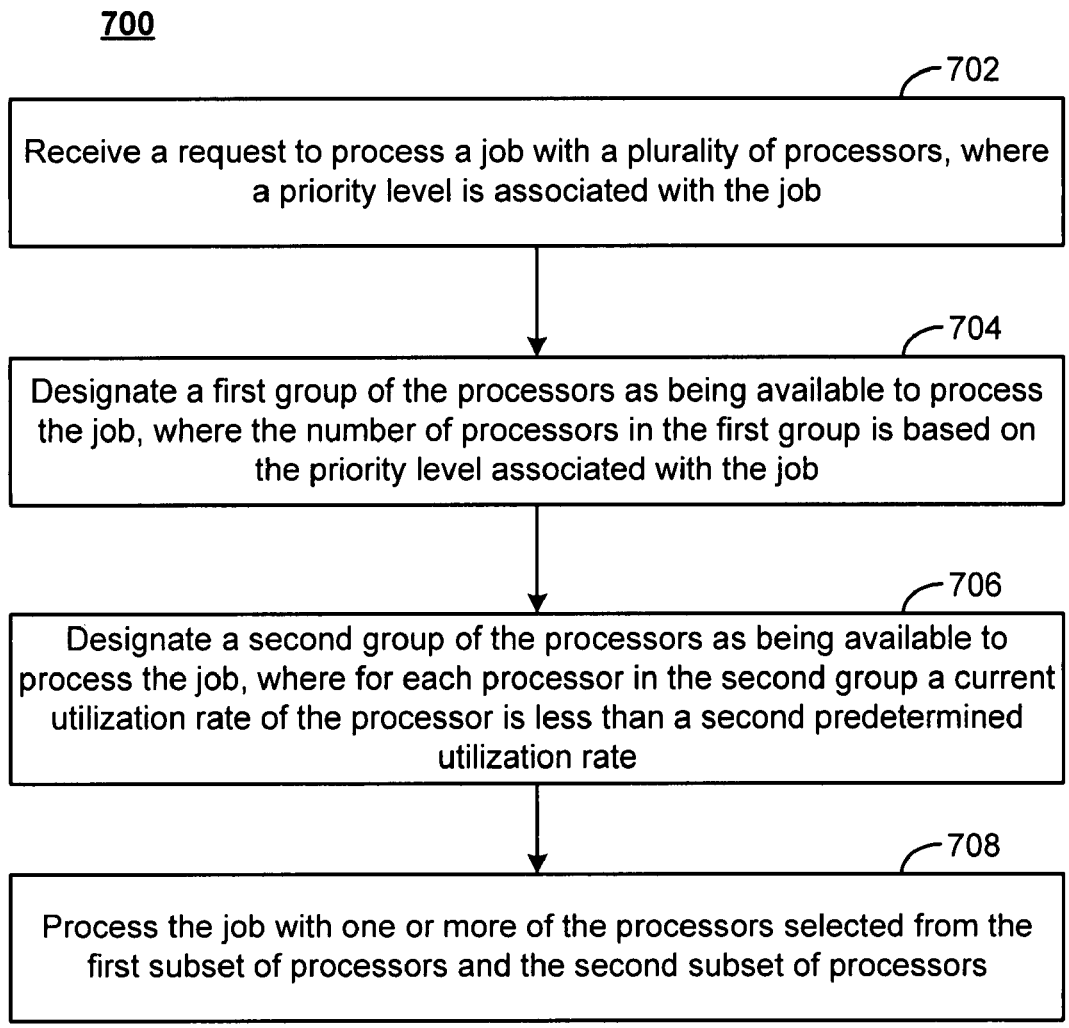
FIG. 7 is a flowchart illustrating example operations for processing computational jobs with a plurality of processors.

FIG. 7 is a flowchart 700 illustrating example operations of the systems of FIGS. 1-6 for processing computational jobs with a plurality of processors. As illustrated in FIG. 7, a request to process a job with a plurality of processors is received, where a priority level is associated with the job (step 702). For example, the scheduling server 140 may receive a request from a client 102 to process a job with processors 502 in a bank 520 of processors. The request may include a request to process the job with a specified number of processors.

A first group of the processors is designated as being available to process the job, where the number of processors in the first group is based on the priority level associated with the job (step 704). For example, the processor grouping engine 512 can divide all the processors 502 in the bank 520 of processors into multiple subsets of processors. The number of subsets can be equal to the number of possible different priority levels for a job. When the request is received and a priority level associated with the request is determined, the grouping engine 512 and/or the scheduling engine 508 can designate the first group of processors to include processors from all subsets that are associated with priority level values 412 that are equal to or greater than (i.e., lower priority) the priority level of the requested job.

A second group of the processors is designated as being available to process the job, where for each processor in the second group a current utilization rate of the processor is less than a second predetermined utilization rate (step 706). For example, the utilization rate service engine 510 may monitor the utilization rate of each processor 502 and may report the rates to the scheduler 508. The scheduler may compare the measured rates to threshold rates stored in a database at the scheduling server 140 to determine whether the current utilization rate is greater than or equal to the threshold rate for processor. Multiple utilization rate thresholds may have to be considered because, as explained with reference to FIG. 6, a threshold value is required for each combination of a priority value for the job and a subset associated with a priority value that is lower than the priority value of the job. Thus, the scheduler may determine that processors from multiple different subsets can be included in the second group.

With these determinations, the job can be processed with one or more of the processors 502 selected from the first subset of processors and the second subset of processors (step 708).

Figure 8:
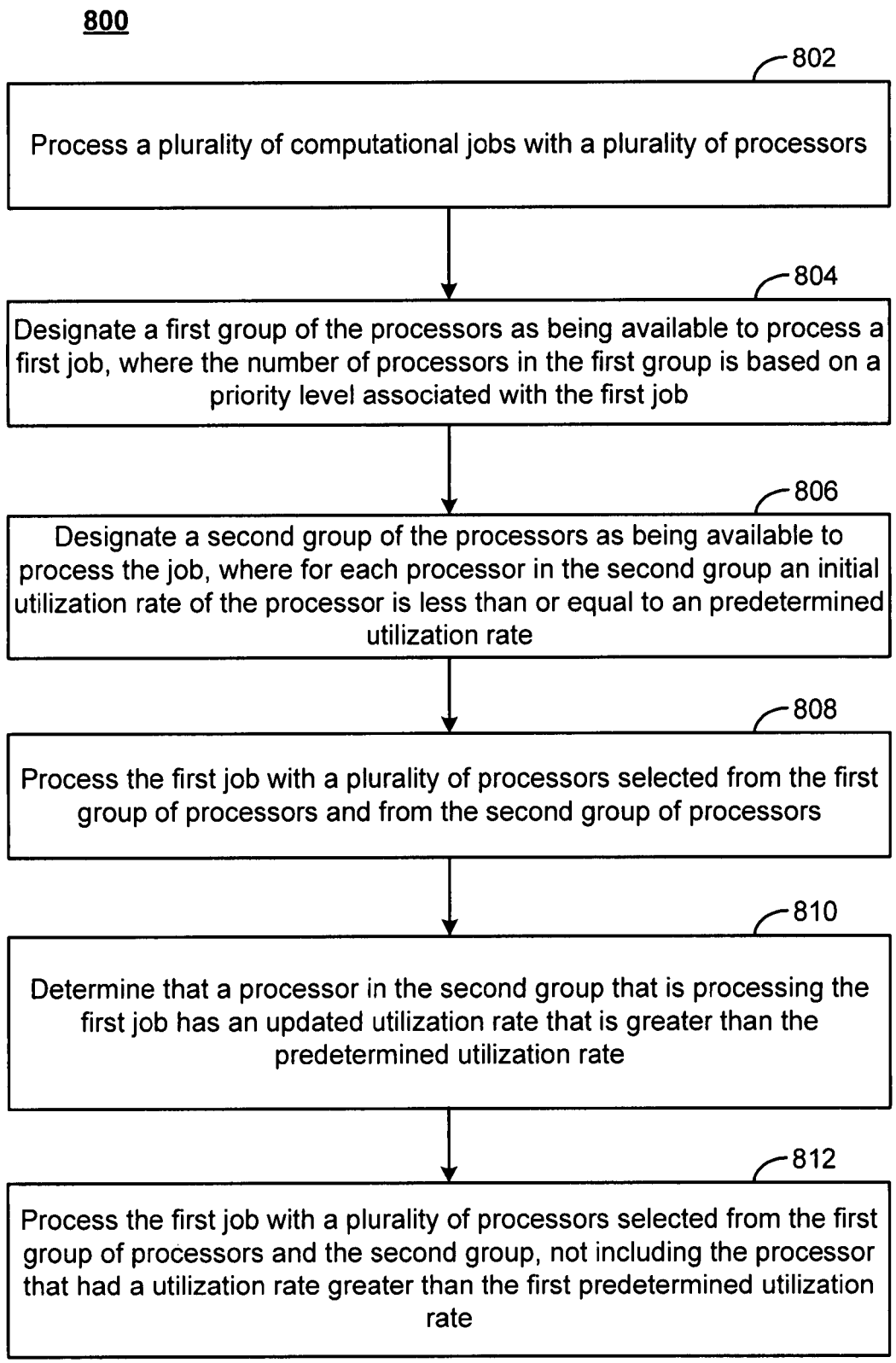
FIG. 8 is a flowchart illustrating additional example operations for processing computational jobs with a plurality of processors.

FIG. 8 is a flowchart 800 illustrating additional example operations of the systems of FIGS. 1-6 for processing computational jobs with a plurality of processors. As illustrated in FIG. 8, a plurality of computational jobs is processed with the plurality of processors (step 802). A first group of the processors is designated as being available to process a first job, where the number of processors in the first group is based on a priority level associated with the first job (step 804). A second group of the processors is designated as being available to process the job, where for each processor in the second group an initial utilization rate of the processor is less than or equal to an predetermined utilization rate (step 806). The predetermined utilization rate is based on the priority level and on a processor subset to which the processor belongs. The first job is processed with a plurality of processors selected from the first group of processors and from the second group of processors (step 808). Then, it is determined that a processor in the second group that is processing the first job has an updated utilization rate that is greater than the predetermined utilization rate (step 810). In response to the determination, the first job is processed with a plurality of processors selected from the first group of processors and the second group, not including the processor that had a utilization rate greater than the first predetermined utilization rate (step 812).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method of processing a computational job with a plurality of processors, the method comprising:
   receiving a request to process a job, wherein a priority level is associated with the job;
   designating a first group of the processors as being available to process the job, wherein the first group of processors is designated for processing high priority jobs and wherein the number of processors in the first group is based on the priority level associated with the job;
   designating a second group of the processors as being available to process the job, wherein the second group of processors is designated for processing high or low priority jobs and wherein for each processor in the second group a current utilization rate of the processor is less than a second predetermined utilization rate;
   determining a number of processors (N) to process the job, wherein N>1; and
   processing the job with the N processors including one or more of the processors selected from the first group of processors and one or more of the processors selected from the second group of processors, wherein at least some of the N processors are selected from the first and second groups based on the selected processors having the lowest current utilization rates of the processors in the respective groups.

2. The method of claim 1, wherein the second predetermined utilization rate is based on the priority level of the job and on a subset of processors to which the processor belongs.

3. The method of claim 1, further comprising:
   processing the job with the N processors selected from the first and second groups having the lowest current utilization rates of processors in the respective groups.

4. The method of claim 3, wherein determining the number of processors to process the job comprises receiving a request to process the job with at least N processors.

5. The method of claim 1, further comprising:
   designating a third group of processors as being available to process the job, wherein for each processor in the third group, a current utilization rate of the processor is less than a third predetermined utilization rate, wherein the third predetermined utilization rate is lower than the second predetermined utilization rate; and
   processing the job with one or more of the processors selected from the first, second, and third groups of processors.

6. The method of claim 1, further comprising:
   queuing the request when the sum of the number of the processors in the first and second groups is less than N; and
   when the sum of the number of the processors in the first and second groups is greater than or equal to N, processing the job with the N processors selected from the first and second groups having the lowest current utilization rates.

7. The method of claim 1, further comprising:
   determining a current utilization rate for processors in the first group;
   re-designating the first group of processors to exclude those processors having a current utilization rate greater than a predetermined first utilization rate;
   queuing the request when the sum of the number of the processors in the re-designated first group and in the second groups is less than N; and
   when the sum of the number of the processors in the re-designated first group and in the second groups is greater than or equal to N, processing the job with the N processors selected from the re-designated first group and from the second group having the lowest current utilization rates.

8. The method of claim 1, further comprising:
   determining a new current utilization rate for processors in the second group; and then
   re-designating the second group of processors to exclude those processors having a new current utilization rate greater than the second predetermined utilization rate; and then
   processing the job with one or more of the processors selected from the first group of processors and the re-designated second group of processors.

9. The method of claim 1, wherein the request is received through a wide area network.

10. A method of processing a plurality of computational jobs with a plurality of processors, the method comprising:
    designating a first group of the processors as being available to process a first job, wherein the first group of processors is designated for processing high priority jobs and wherein the number of processors in the first group is based on a priority level associated with the first job;
    designating a second group of the processors as being available to process the job, wherein the second group of processors is designated for processing high or low priority jobs and wherein for each processor in the second group an initial utilization rate of the processor is less than or equal to an predetermined utilization rate that is based on the priority level and on a processor subset to which the processor belongs;

determining a number of processors (N) to process the first job, wherein N>1;

processing the first job with the N processors including one or more of the processors selected from the first group of processors and one or more of the processors selected from the second group of processors, wherein at least some of the N processors are selected from the first and second groups based on the selected processors having the lowest current utilization rates of the processors in the respective groups;

determining that a processor in the second group that is processing the first job has an updated utilization rate that is greater than the predetermined utilization rate; and then in response to the determination, processing the first job with a plurality of processors selected from the first group of processors and the second group, not including the processor that had a utilization rate greater than the first predetermined utilization rate.

11. The method of claim 10, further comprising, for each computational job being processed with the plurality of processors:

designating a primary group of the plurality of processors as being available to process the job, wherein the number of processors in the primary group for each job is based on a priority level associated with the job, processing the job with a group of processors selected from the primary group of processors for the job and a supplemental set of the plurality of processors not belonging to the primary group;

determining that a processor in the supplemental set used to process the job has a utilization rate greater than a utilization rate determined by the priority level of the job; and in response to the determination, processing the job with a plurality of processors selected from the first group of processors and the second group, not including the processor that had a utilization rate greater than the first predetermined utilization rate.

12. A system for processing a computational job, the system comprising:

an input queue adapted for receiving a computational job to process, wherein a priority level is associated with the job; a plurality of processors;

a utilization rate service engine adapted to determine a utilization rate of the processors;

a processor grouping engine configured for grouping processors of the plurality of processors into:

a first group of processors designated as being available to process the job, wherein the number of processors in the first group is based on the priority level associated with the job and wherein the first group of processors is designated for processing high priority job, and a second group of processors, for which a current utilization rate is less than a second predetermined utilization rate and designated as being available to process the job, wherein the second group of processors is designated for processing high or low priority jobs; and a scheduling engine adapted to receive information about the priority level of the job and about the utilization rates of the processors and to schedule the job to be processed by a number (N) of processors, wherein N>1, including one or more of the processors selected from the first group of processors and one or more of the processors selected from the second group of processors, wherein at least some of the N processors are selected from the first and second groups based on the selected processors having the lowest current utilization rates of the processors in the respective groups.

13. The system of claim 12, wherein the first group consists of one processor.

14. The system of claim 12, wherein the scheduling engine is adapted to schedule the job to be processed with the N processors selected from the first and second groups having the lowest current utilization rates.

15. The system of claim 12, wherein the determination of the number of processors (N) to process the job is based on the request.

16. The system of claim 12, wherein the processor grouping engine configured for grouping processors of the plurality of processors into a third group of processors for which a current utilization rate of the processor is less than a third predetermined utilization rate is designating as being available to process the job, wherein the third predetermined utilization rate is lower than the second predetermined utilization rate and wherein the scheduling engine is further adapted to schedule the job to be processed by one or more of the processors selected from the first, second, and third groups of processors.

17. The system of claim 12, wherein the scheduling engine is further adapted to:

hold the job in the queue when the sum of the number of the processors in the first and second groups is less than N; and release the job for processing by the N processors selected from the first and second groups having the lowest current utilization rates of the job when the sum of the number of the processors in the first and second groups is greater than or equal to N.

18. The system of claim 12, wherein the utilization rate service engine is further adapted to determine a current utilization rate for processors in the first group;

and wherein the processor grouping engine is further adapted to re-designate the first group of processors to exclude those processors having a current utilization rate greater than a predetermined first utilization rate;

wherein the scheduling engine is further adapted to hold the job in the queue when the sum of the number of the processors in the re-designated first group and in the second group is less than N; and wherein the scheduling engine is further adapted to release the job for processing by the N processors selected from the re-designated first group and from the second group having the lowest current utilization rates when the sum of the number of the processors in the re-designated first group and in the second groups is greater than or equal to N.

19. The system of claim 12, wherein the utilization rate service engine is further adapted to determine a new current utilization rate for processors in the second group;

wherein the processor grouping engine is further adapted to re-designate the second group of processors to exclude those processors having a new current utilization rate greater than the second predetermined utilization rate; and wherein the scheduling engine is further adapted to schedule the job to be processed by one or more of the processors selected from the first group of processors and the re-designated second group of processors.

20. The system of claim 12, wherein a plurality of processors are adapted to process the job in parallel.

* * * * *